United States Patent [19]

Deprez et al.

[11] 4,264,247
[45] Apr. 28, 1981

[54] MECHANISM FOR LOADING AND UNLOADING WORKPIECES

[75] Inventors: Thomas A. Deprez, Rochester; David A. Wright, Macedon, both of N.Y.

[73] Assignee: The Gleason Works, Rochester, N.Y.

[21] Appl. No.: 66,893

[22] Filed: Aug. 16, 1979

[51] Int. Cl.$^3$ .............................................. B23F 23/04
[52] U.S. Cl. .................................... 409/7; 414/744 A; 414/774
[58] Field of Search ............... 409/6, 7; 414/590, 729, 414/744 A, 774

[56] References Cited

U.S. PATENT DOCUMENTS

| 2,382,013 | 8/1945 | King ........................................ 409/7 |
| 2,585,809 | 2/1952 | Male ........................................ 409/7 |
| 3,021,764 | 2/1962 | Durdin .................................... 409/7 |
| 3,945,483 | 3/1976 | Reinke et al. ..................... 414/729 X |
| 4,013,176 | 3/1977 | Lohneis et al. .............. 414/744 A X |

*Primary Examiner*—Z. R. Bilinsky
*Attorney, Agent, or Firm*—Morton A. Polster; Ralph E. Harper

[57] ABSTRACT

A mechanism for loading and unloading workpieces includes a transfer arm for aligning a number of workpieces into a stack which can then be moved to a loading arm for placement of the stack of workpieces on an arbor of a gear manufacturing machine.

8 Claims, 4 Drawing Figures

MECHANISM FOR LOADING AND UNLOADING WORKPIECES

BACKGROUND AND BRIEF DESCRIPTION OF INVENTION

The present invention relates to devices for loading workpieces into and out of machines which process the workpieces, and the invention specifically provides for a mechanism capable of arranging and handling stacks of such workpieces for being loaded and unloaded relative to a machine which forms the stacks of workpieces into spur or helical gears.

Various types of work-handling and work-transferring devices are known for presenting workpieces to machinery capable of removing stock from the workpieces. The present invention is concerned with the problem of handling stacks of workpieces relative to a gear manufacturing machine which has a capability of processing more than one workpiece, and up to seven or more workpieces, at a time. With such a machine, the problem of loading and unloading is made more difficult by the fact that entire stacks of workpieces must be handled in their movements from a banking area to the work station of the machine and eventually to an unloading station of the machine. In addition, it is desirable that a mechanism for handling stacks of workpieces be adjustable to accomodate different stack thicknesses and different diameters of workpieces in any given stack. Finally, a loading and unloading mechanism for such a machine should allow for manual loading of the work station of the machine in case smaller quantities of workpieces are to be handled or in case of a malfunction of the loading and unloading mechanism.

The present invention solves the problem of handling more than one workpiece at a time with a mechanism having a storage station for holding a quantity of banked workpieces, a transfer arm for receiving discrete stacks of workpieces released from the storage station, and a loading arm for moving stacks of workpieces from the transfer arm to the work station of the machine. In a specific embodiment of the invention, the storage station is constructed with separate channels, arranged in a side-by-side relationship, for receiving a number of workpieces in each channel. The number of channels corresponds to the number of workpieces to be included in each stack, and this provides for an alignment of the banked workpieces in discrete stacks which can be moved, one at a time, from the storage station to the work station of the machine. Movement of separate stacks of workpieces is achieved with a transfer arm which serves to bring the workpieces into correct alignment with one another as the workpieces are released from the storage station. Additionally, the transfer arm clamps and holds each stack in its aligned condition as the stack is moved away from the storage station. The transfer arm is controlled to reorient each stack of workpieces from the position they are in when released by the storage station to a position which corresponds to the orientation required at the work station of the machine. Final movement of the reoriented stack of workpieces is provided for by a loading arm which receives and holds each stack of workpieces discharged from the transfer arm and which then swings the stack of workpieces to a position where the workpieces can be lowered onto a work-holding arbor of the machine. After the workpieces have been processed, they are lifted, again as a discrete stack, from the arbor by the loading arm, after which they are swung to a position for being lowered and unloaded at an unloading station of the machine.

Specific features of the mechanism allow it to handle different thicknesses and diameters of stacks of workpieces. The mechanism is designed to permit ease of access to the work station of the machine in the event that manual loading is required for any reason, and the working elements of the mechanism are relatively simple and easily maintained and adjusted. Control of the mechanism is tied directly to the processing cycle of the gear manufacturing machine and is, therefore, efficient and reliable.

These and other features and advantages of the invention will become apparent in the more detailed discussion which follows, and in that discussion reference will be made to the accompanying drawings as briefly described below.

DETAILED DESCRIPTION OF INVENTION

Figure 1:
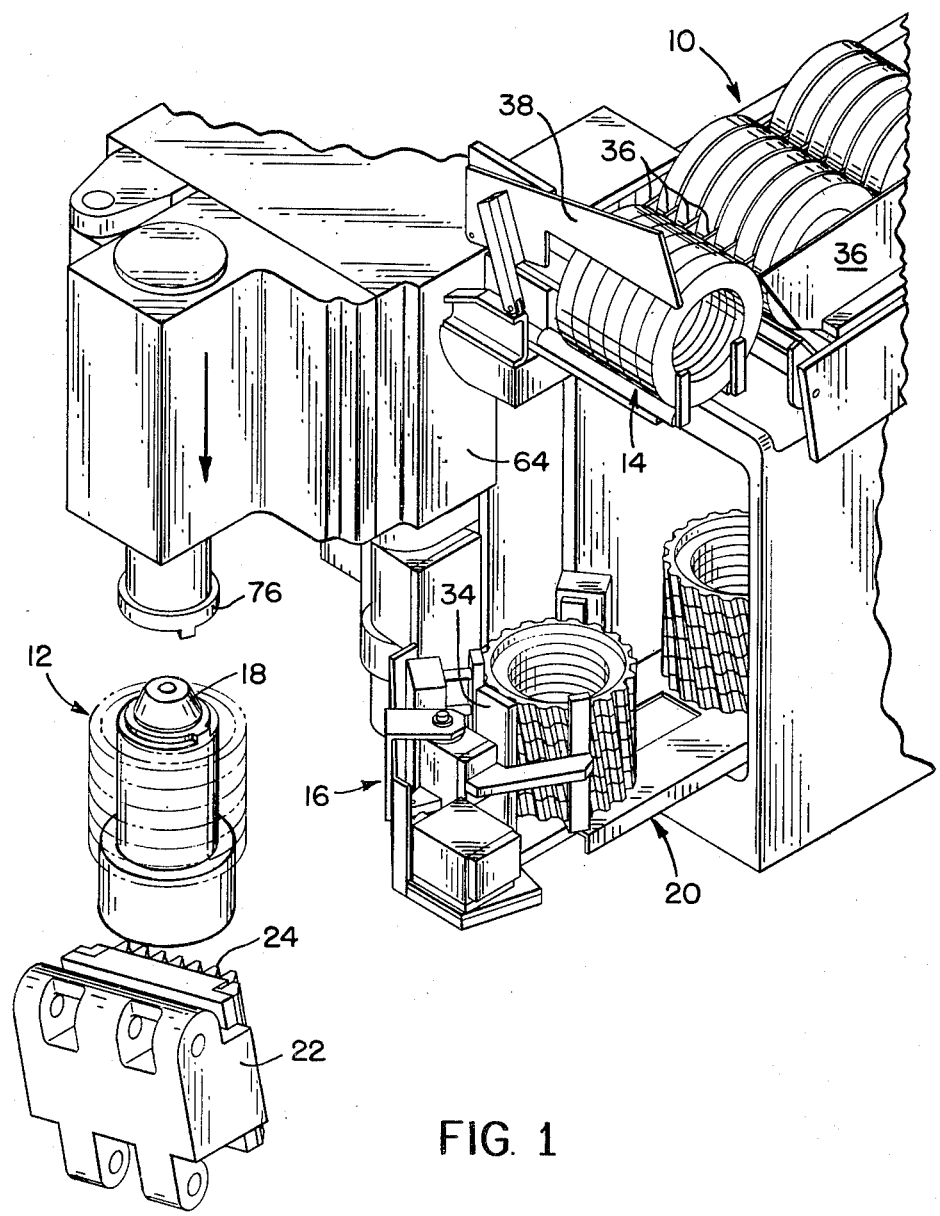
FIG. 1 is an isometric view of the loading and unloading mechanism of the present invention as installed on a gear manufacturing machine.

FIG. 1 illustrates the mechanism of the present invention with reference to the loading and unloading of gear blanks relative to a gear cutting machine. Only a portion of the machine is shown for purposes of clarity, but the machine may comprise any known gear cutting or grinding apparatus which includes an arbor for holding a number of stacked gears while they are being cut or ground into spur or helical gears. The type of machine for which the present invention was developed consists of a gear cutting machine having an endless chain for carrying one or more rows of cutting or grinding tools into engagement with a stack of gear blanks. Machines of this type are known, and reference may be made to my co-pending U.S. patent applications Ser. Nos. 929,600 filed July 31, 1978 and 930,252, filed Aug. 2, 1978 for example, for a more detailed discussion of machines of this type.

As shown in FIG. 1, the loading and unloading mechanism of the present invention is made up of several basic components. Firstly, there is a storage station 10 for holding a quantity of workpieces before they are loaded into the machine. As will be discussed in greater detail below, the storage station 10 has means for arranging selected numbers of the gear blanks in separate stacks which can be transferred, one stack at a time, to a work station 12 of the machine. A transfer arm 14 is positioned adjacent to the storage station 10 for receiving a single stack of workpieces at a time for the storage station, and the transfer arm is arranged to move about a pivotal axis from its starting position adjacent to the storage station to a position where the stack of gear blanks can be received by a loading arm 16. The loading arm 16 functions to move the stack of unprocessed workpieces to a work-holding arbor 18 at the work station 12 of the machine. The loading arm also functions to remove processed workpieces from the work station 12 and to deliver such workpieces to an unloading station 20 of the machine. In the FIG. 1 illustration, a stack of cut gears is shown as being delivered to the unloading station 20 for movement therefrom by a conveyor or other removal means associated with the mechanism. When the loading arm 16 is in a position for delivering a stack of gears to the unloading station 20, a tailstock 64 and outboard support 76 should be in a lowered position from what is shown in FIG. 1, however, the raised position is shown for purposes of illustrating and explaining the invention.

FIG. 1 also shows a new stack of gear blanks in a position on the transfer arm 14 for being transferred to the loading arm 16 after the loading arm 16 has discharged its load of cut gears. A single link 22 of an endless chain of articulated links is shown in FIG. 1, and the single link is illustrated as carrying rack-type cutting tools 24.

Figure 2:
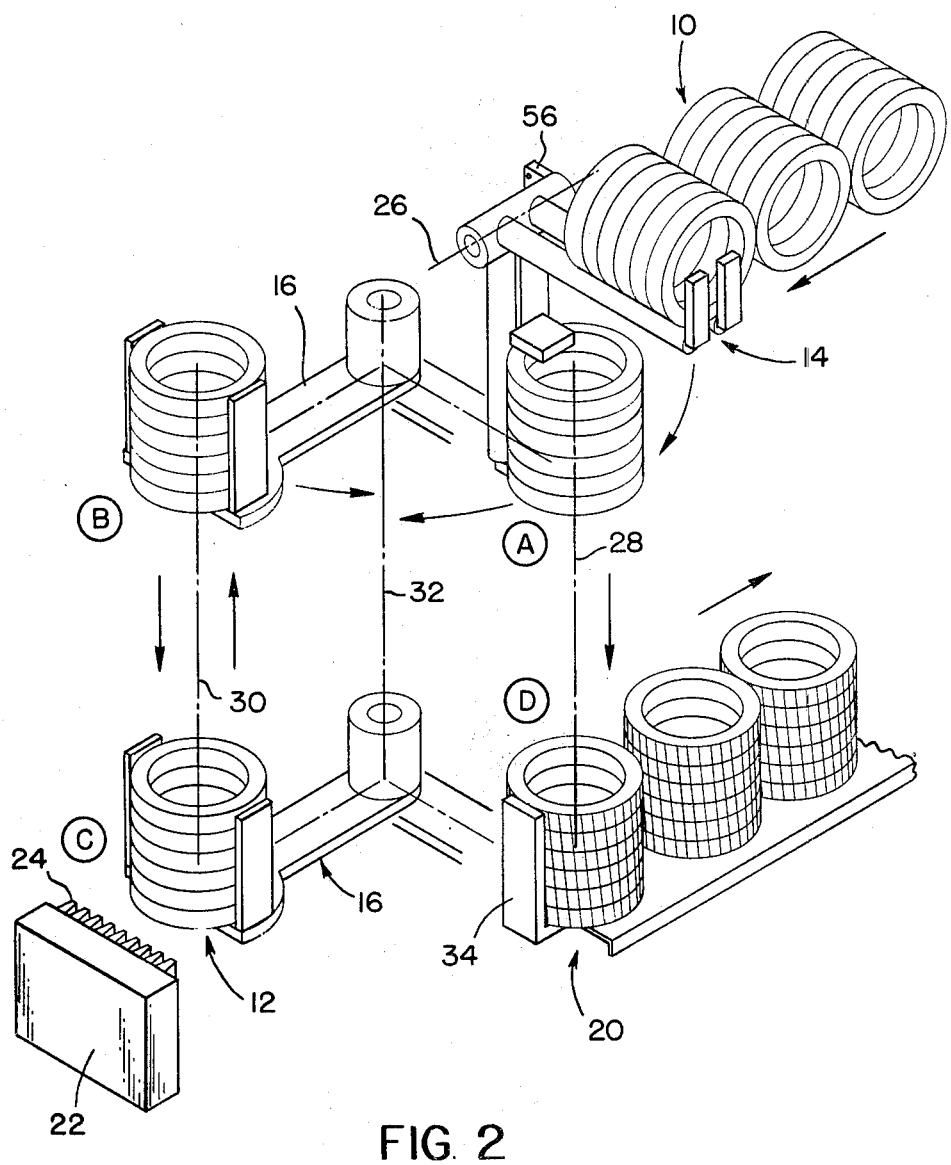
FIG. 2 is a schematic illustration showing the orientation and positions of stacks of parts at different points in time during the operation of the loading and unloading mechanism of this invention.

FIG. 2 illustrates the sequence of movements available with the basic components of the loading and unloading of the present invention. In this illustration single components are shown in more than one position for purposes of describing the functions of the mechanism, but it is to be understood that only a single transfer arm 14 and a single loading arm 16 are included in the illustrated machine set-up.

In the FIG. 2 illustration, two stacks of gear blanks are shown in the storage station 10 of the machine. These stacks are banked and held in readiness for ultimate transfer, and an additional stack is positioned on the transfer arm 14 in its uppermost position adjacent to the storage station 10. At an appropriate time in the cycle of the mechanism, the transfer arm 14 is pivoted about an axis 26 to provide for a reorientation of its contained stack of workpieces from the orientation they are in when released by the storage station to an orientation which corresponds to the position of the stack when it is eventually received at a work station 12 of the machine. The transfer arm discharges its load onto a loading arm 16 when the loading arm 16 is in a first position A and when the transfer arm is in its lowered position relative thereto. In the first position A, the workpieces are oriented in such a way that the stack has a central axis 28 parallel to an axis 30 of a work-holding spindle of the machine.

From the first position A, the loading arm is then moved to a second position B in which the central axis of the stack is aligned with the axis 30 of the workholding spindle of the machine. At this point the stack is in a raised position over the work-holding spindle and is in readiness for being lowered over an arbor or other work-holding device.

In the third position C the stack is shown as having been placed on the work-holding spindle of the machine through a lowering of the loading arm 16. At this point the blanks are processed. From there the loading arm 16 is lifted, swung about its axis 32, and lowered to a fourth position D in which a stack of processed gears is axially aligned with the first position A but at a lower level for being received at the unloading station 20 of the machine.

In a typical operation of the loading and unloading mechanism, the transfer arm 14 initially pivots about its axis 26 through an arc of about 90 degrees to place a stack of work blanks in the first position A. As this movement is taking place, the loading arm 16 is in readiness at the first position A for receiving the load of blanks. Then, the transfer arm 14 unclamps its load of blanks, leaving them in position on the loading arm 16, and swings even further about its pivot 26 for an additional 10 degrees to clear the position of the stack on the loading arm 16. At this time, the loading arm 16 is operated to swing about its axis 32 from the first position A to the second position B. From there, the loading arm 16 is lowered so as to place its load upon the work-holding arbor of the machine at the work station 12, after which, the loading arm releases its hold on the work blanks so that they can be contacted and processed by the cutting tools of the machine. While the workpieces are being processed, the loading arm 16 remains in the third position C but out of contact with the stack of workpieces so as to permit rotation of the stack as the cutting process takes place. Upon completion of a cutting cycle, the loading arm 16 reclamps the stack of workpieces and raises them back to the second position B to clear the arbor of the machine. From there, the finished stack is swung to position A and then lowered to position D for being unclamped and released onto a conveyor or other unloading device at the unloading station 20. At the unloading station 20, a pusher arm 34 is hydraulically operated to push each stack of finished workpieces onto a slide or other form of unloading conveyor. The transfer arm 14 is raised to receive another stack of gears as soon as the loading arm 16 swings a load of blanks from position A to position B.

Figure 3:
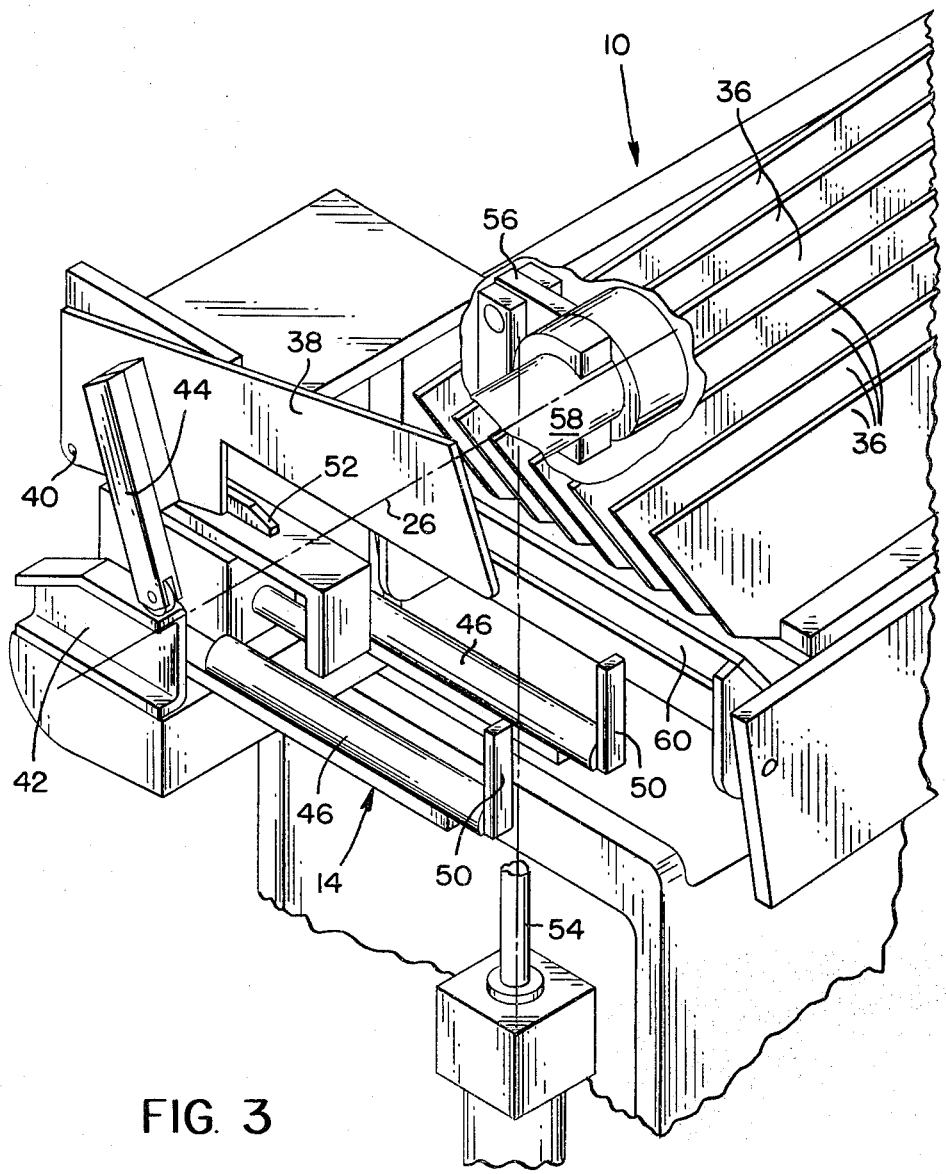
FIG. 3 is an isometric view, in enlarged scale from that shown in FIG. 1, of a storage station and transfer arm structure for the loading and unloading mechanism of this invention.
Figure 4:
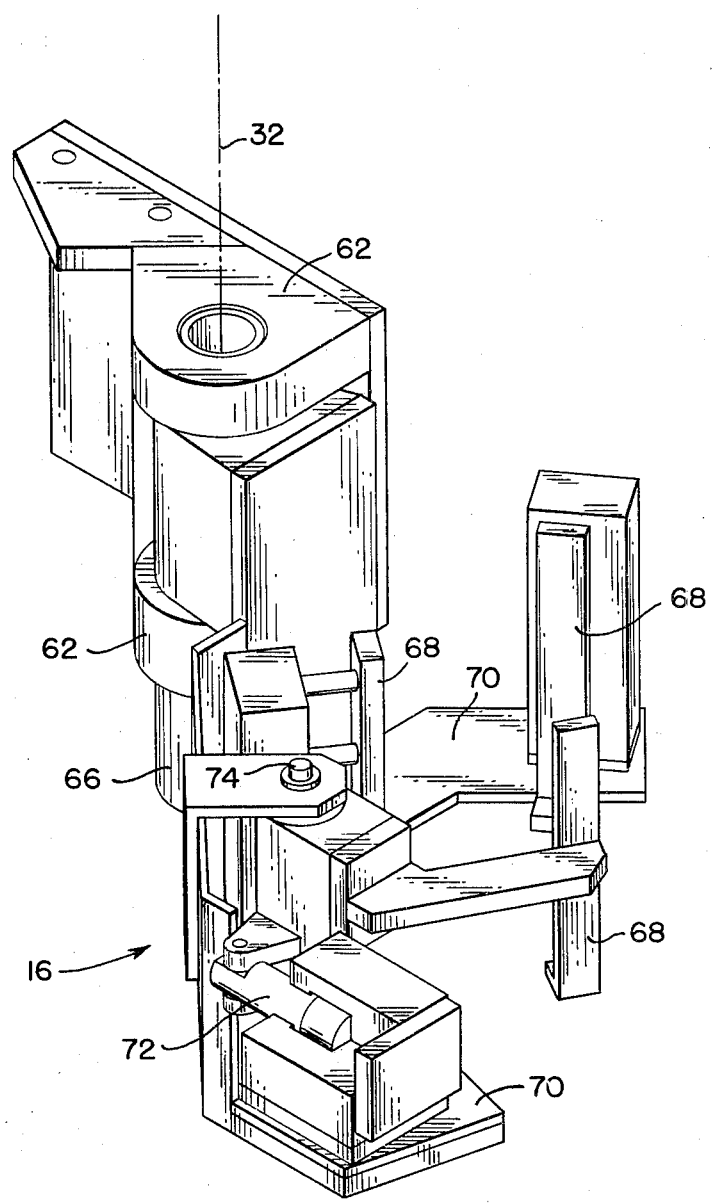
FIG. 4 is an isometric view, in the same scale as that of FIG. 3, of a loading arm associated with the loading and unloading mechanism of the present invention.

Specific assembly and control of the working components of the loading and unloading mechanism can be carried out in various ways to provide the basic sequence of operations discussed above. However, FIGS. 3 and 4 illustrate preferred structural features and embodiments of the mechanism of the present invention. Referring to FIG. 3, it can be seen that the storage area 10 includes a number of guide plates 36 for defining separate channels for receiving workpieces. The number of channels corresponds in number to the number of workpieces to be included in each stack arranged for movement to the work station of the machine, and in the illustrated embodiment, six channels are provided for creating a stack of six workpieces. However, greater or lesser numbers of channels may be provided as desired. The separate channels defined between the guide means 36 can be filled with workpieces, and preferably a bottom portion of the work station 10 is inclined to a horizontal plane so as to provide for a gravity movement of the workpieces from an upper end of the storage station to a discharge end thereof. With such an arrangement, it is possible to manually load a great number of workpieces into the storage station 10 with the result that the great number of workpieces will be arranged into several stacks ready for movement to the work station of the machine.

At the discharge end of the storage station 10, there is located a movable barrier 38 which can be lowered from the position shown in FIG. 3 (about a pivot 40) to block movement of a stack of gears from the storage station 10 onto the transfer arm 14. Movement of the barrier 38 is dictated by movements of the transfer arm 14. When the transfer arm 14 is raised to its uppermost position, as shown in FIG. 3, an element 42, which is secured to the transfer arm 14, contacts a follower 44 fixed to the movable barrier 38. Such contact raises the barrier 38 to its illustrated position for permitting a gravity feed of a stack of gears from the end of the storage station 10 onto a pair of parallel arms 46 of the transfer arm 14. The pair of arms 46 are secured to a base portion of the transfer arm 14 as shown in FIG. 2 and are arranged to receive and correctly align each of the disc-shaped workpieces which roll from the storage station onto the transfer arm. A clamping element 48 is hydraulically actuated to press the stack of gears against upright gripping elements 50 carried at the ends of the support arms 46, and this provides for a securement of the stack of gears relative to the transfer arm. A cam element 52 is carried at the top of the clamping element 38 for contacting a switch (not illustrated) of known design and in circuit with the control circuits for the loading and unloading mechanism. This switch provides a means for detecting the presence of a full stack of workpieces in the transfer arm before the transfer arm makes its movement away from the storage station. If a workpiece is missing, the clamping member 48 advances to a position which causes the cam element 52 to contact a switch and to thereby disconnect further functioning of the loading cycle. Relative positioning of the switch or the cam element can be adjusted to provide for a detection of greater or lesser numbers of workpieces in the transfer arm in accordance with the number desired to be included in each stack presented to the work station of the machine.

The transfer arm 14 is swung about its axis 26 through the control of a hydraulically operated pushrod 54 secured to a lever arm 56 carried at the end of a sleeve 58 connected to the pair of support arms 46 of the transfer arm 14. From the position illustrated in FIG. 3, the transfer arm 14 can be pushed downwardly 90 degrees for placing its contained stack of gears within the confines of the loading arm 16 when the loading arm 16 is in the position A of FIG. 2. After the stack is clamped by clamping elements of the loading arm 16, the clamping element 48 of the transfer arm is moved out of gripping engagement with the stack, and the transfer arm 14 is swung about its axis 26 for an additional 10 degrees so as to provide clearance between the transfer arm 14 and the loading arm 16. In this way, the loading arm 16 can then swing the contained stack of gears about its axis 32, and the transfer arm 14 can return to its uppermost position as shown in FIG. 3. Conventional sensing and switching devices are carried by the transfer arm for detecting its positions and for controlling its movements.

While the transfer arm 14 is in a lowered position from that shown in FIG. 3, the movable barrier 38 drops to a position which blocks movement of a next set of gears making up a stack. This movement takes place automatically as the transfer arm 14 is lowered with a contained stack of gears and as a next set of gears rolls from the end of the storage station 10 to a position where they are blocked by the movable barrier 38. As each set of gears rolls out of the discharge end of the storage station 10, a bridging element 60 is pivoted to a position which bridges a gap between the end of the guide means 36 and the position the blanks will occupy when they are received on the transfer arm 14. The bridging means 60 is counterbalanced so that it pivots upwardly to the position shown in FIG. 3 while a stack of gears is being lowered by the transfer arm 14. Then, when the next set of gears rolls into position against the movable barrier 38, the bridging member 60 is pressed downwardly to span the open area between the storage station and the transfer arm.

FIG. 4 illustrates the assembly which comprises the loading arm 16. Basically, this assembly includes a support spindle mounted to rotate the loading arm about the axis 32, and the support spindle is secured in brackets 62 which are fixed to a tailstock 64 (see FIG. 1) of the machine. A conventional hydraulic oscillating cylinder 66 is provided for rotating the loading arm 16 about the axis 32. Position of the loading arm is controlled with conventional switches and control circuits. Three clamping elements 68 provide support for a stack of gears being moved by the loading arm, and these three elements are carried on a base plate 70 which is designed to permit clearance for the transfer arm and clearance for the cutting tools of the machine when the loading arm is positioned at the work station of the machine. A hydraulic ram 72 is provided for moving one of the clamping elements 68 about a pivot at 74 for holding and releasing the clamping element relative to a stack of gears. The remaining clamping elements 68 may be hydraulically or manually adjustable to permit adjustment of the loading arm to stacks of gears having different diameters. Up and down movements of the loading arm 16 are directly related to up and down movements of the tailstock 64 (see FIG. 1) of the machine since the loading arm is secured to the tailstock 64. This provides for an automatic positioning of the loading arm in raised and lowered positions in accordance with the machine securement of a work spindle outboard support 76 with a stack of gears held on the machine arbor 18. Thus, when a machining cycle is completed, the arbor 18 will dechuck the gear stack, the machine tailstock 64 will be lifted to disengage the outboard support 76 from the top of the arbor 18, and simultaneously the loading arm 16 will lift and carry with it the processed set of gears. The lifting movement is sufficient to cause the stack of processed gears to clear the arbor 18 so that the loading arm 16 can swing the stack from the position B to the position A and then to the position D shown in FIG. 2.

Although the invention has been described with reference to a particular embodiment, it can be appreciated that fully equivalent structures can be substituted for those which have been described. All such equivalent substitutions are intended to be included within the scope of the invention as described in the claims below.

What is claimed is:

1. A mechanism for loading and unloading a selected number of workpieces relative to a work station of a gear manufacturing machine having a capability of processing more than one workpiece at a time, said mechanism comprising a storage station for holding a quantity of workpieces before they are loaded into the machine, said storage station having means for arranging selected numbers of the workpieces in separate stacks which can be transferred, one stack at a time, to a work station of the machine, a transfer arm for receiving a stack of workpieces from said storage station, a loading arm for receiving and moving a stack of unprocessed workpieces from said transfer arm to a work station of the machine, and for delivering a stack of processed workpieces from the work station to an unloading station of the machine, said loading arm being operatively connected to a tailstock of the machine, said tailstock being arranged to lift and lower relative to the work station of the machine, to thereby provide for lifting and lowering movements of the loading arm as the tailstock is lifted and lowered, and means for moving said loading arm through a series of positions which include
- a first position in which said workpieces are oriented in a stack having a central axis parallel to the axis of a work-holding spindle of the machine,
- a second position in which the central axis of said stack is aligned with said axis of the work-holding spindle,
- a third position in which said stack is placed on said work-holding spindle, and
- a fourth position in which the central axis of said stack is again parallel to the axis of the work-holding spindle of the machine.

2. The mechanism of claim 1 wherein said loading arm is carried by a support spindle having a central axis parallel to the axis of the work-holding spindle of the machine, and wherein said means for moving said loading arm operates to lift, lower and rotate the loading arm on the axis of said support spindle to each of said four positions.

3. The mechanism of claim 1 wherein said loading arm includes clamping means for gripping a stack of workpieces being carried by the loading arm.

4. The mechanism of claim 1 wherein said storage station includes
- guide means defining separate channels for receiving said workpieces, said channels corresponding in number to the number of workpieces to be included in each stack arranged for movement to the work station of the machine,
- a movable barrier at the discharge end of said channels for alternately blocking and releasing movement of each stack of workpieces from the storage station to the transfer arm.

5. The mechanism of claim 4 wherein said channels are inclined relative to a horizontal plane so that individual workpieces can roll toward a lower end of said storage station for eventual release to said transfer arm.

6. The mechanism of claim 5 and including means for detecting the presence of a full stack of workpieces in said transfer arm, said means for detecting being operatively associated with said control means to prevent continuation of a loading cycle when an incomplete stack is detected.

7. The mechanism of claim 4 wherein said movable barrier is mechanically actuated by the relative position of said transfer arm to said storage station.

8. The mechanism of claim 1 wherein said transfer arm includes a base portion having a parallel pair of support arms extending outwardly from the base portion for receiving and aligning a stack of disc-shaped workpieces received from said storage station.

* * * * *